Oct. 14, 1969  R. B. BURDEN, JR  3,472,185

METHOD AND APPARATUS FOR DESTROYING SLUDGE

Filed July 18, 1967

ROY B. BURDEN JR.
*INVENTOR*

BY

BUCKHORN, BLORE, KLARQUIST & SPARKMAN
*ATTORNEYS*

United States Patent Office 3,472,185
Patented Oct. 14, 1969

3,472,185
METHOD AND APPARATUS FOR DESTROYING SLUDGE
Roy B. Burden, Jr., Sherwood, Oreg., assignor to General Incinerators of California, Inc., San Diego, Calif., a corporation of California
Filed July 18, 1967, Ser. No. 654,173
Int. Cl. F23g *3/00;* F23r *1/14;* F23b *3/00*
U.S. Cl. 110—8                                 7 Claims

ABSTRACT OF THE DISCLOSURE

The apparatus of the application comprises a screw conveyor having a hollow shaft, one end of which terminates centrally within the base portion of a cylindrical burner tube. The casing of the screw conveyor terminates at a conically tapered nozzle end portion which encloses the open discharge end of the hollow conveyor shaft and projects into the burner tube centrally of its base. As the shaft of the conveyor rotates, sludge fed into the input end of the conveyor casing from a dewatering means is conveyed to and deposited within the nozzle end thereof. At the same time air blown through the hollow shaft into the nozzle end of the casing forces a spray of sludge deposited within the nozzle out through nozzle apertures into the burner tube. The discharged sludge is whirled in a rotary path through the burner tube by blasts of primary combustion air introduced into the tube at its base as fuel is also injected into the tube and ignited to heat and effect combustion of the whirling sludge particles.

BACKGROUND OF THE INVENTION

Field of the invention

The present invention relates to a method of and apparatus for conveying and destroying by burning, waste solids such as sewage sludge.

Description of the prior art

The efficient disposal of sludges, by whatever means, has always been a problem. Disposal of sludge by open air drying and storage requires time and large areas of land, and furthermore is unsightly and creates unpleasant odors. Disposal of sludge by burning has heretofore required expensive equipment which many cities, manufacturers and others have been reluctant to purchase because of its high cost. Moreover, the burning of sludge by previous methods has resulted in large quantities of residue which itself creates disposal problems.

SUMMARY OF THE INVENTION

A primary object of the present invention is to provide a new and improved method of conveying and destroying sludge by burning, which leaves little, if any, residue.

Another primary object of the invention is to provide new and improved apparatus for carrying out the above method.

More specifically, an object of the invention is to provide new and improved apparatus for conveying and discharging sludge in a spray into a combustion chamber.

Another object is to provide new and improved apparatus including burner means for destroying sludge sprayed into a combustion chamber.

Another object is to provide new and improved apparatus for conveying and destroying sludge that is economical to build, install, maintain and operate, and that is adaptable to any desired size of installation.

BRIEF DESCRIPTION OF THE DRAWING

The foregoing and other objects and advantages will become more apparent upon inspection of the following detailed description taken in conjunction with the accompanying drawing, in which.

DETAILED DESCRIPTION

Figure 1:
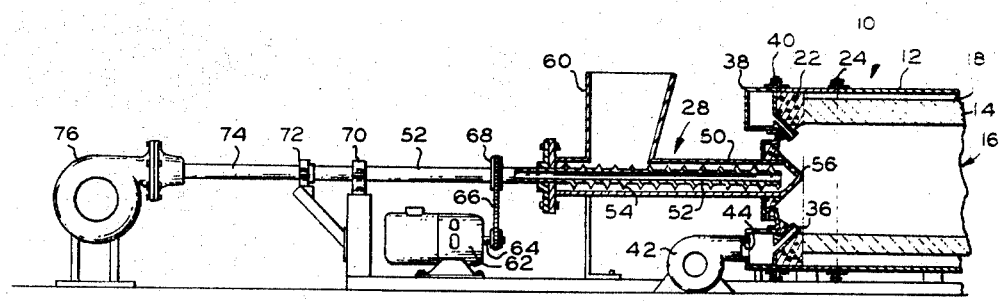
FIG. 1 is a schematic side elevational view, partly in section, showing apparatus in accordance with the present invention.
Figure 2:
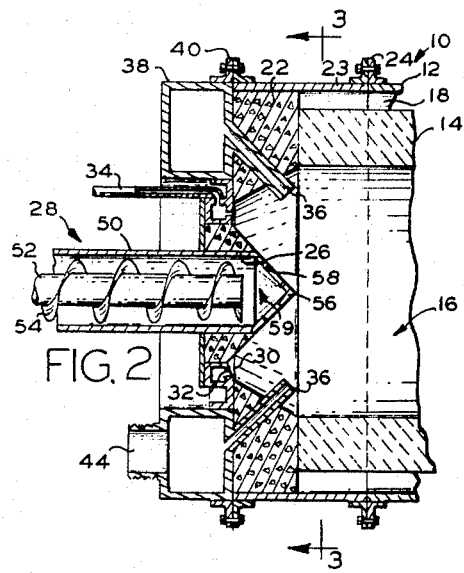
FIG. 2 is an enlarged sectional view of the discharge end of the conveyor apparatus and the base of the burner tube of FIG. 1.
Figure 3:
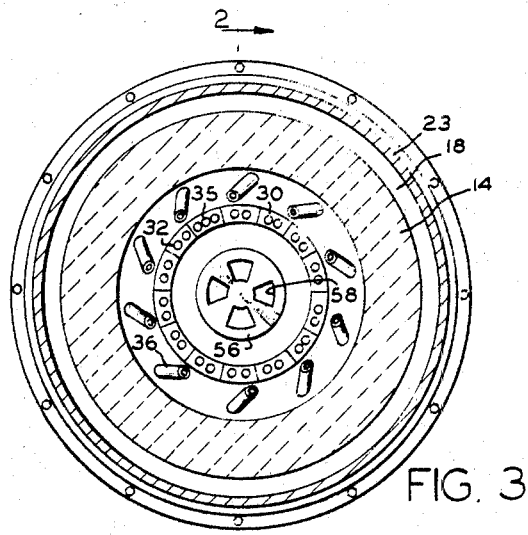
FIG. 3 is a plan view taken along the line 3—3 of FIG. 2.

With reference to the drawing, the apparatus includes a cylindrical burner tube 10 having an outer steel shell 12 and an inner refractory liner 14 defining a combustion chamber 16. An insulating air space 18 between the liner 14 and shell 12 may be filled with noncombustible insulating material such as asbestos if desired. The burner tube has a cylindrical base constructed as a separate unit, including a concrete inner base portion 22 and an outer steel jacket 23 joined to the main shell 12 of the burner tube by annular angle brackets 24. The concrete base portion 22 has a central opening 26 for receiving the projecting discharge end or nozzle portion of a screw conveyor 28. Positioned in the base radially outwardly from the screw conveyor 28 is a burner ring 30 having orifices 32 through which fuel such as gas or oil is injected into the combustion chamber. Fuel flows into the ring through a fuel 34 from a supply source (not shown). Ignition means 35 on the ring ignites fuel injected into the chamber through the orifices 32. The ring 30 is preferably constructed in segments of equal size, joined together by close nipple fittings (not shown), although a one-piece burner could be used. The diameter of the burner ring 30 is therefore adjustable by adding or removing segments as desired according to the requirements of a given installation and diameter of the burner tube for which the ring is intended.

A plurality of annularly arranged tuyeres 36 project tangentially into the combustion chamber 16 from the base portion 22 at a position radially outwardly of the burner ring 30. The tuyeres are fixed at their inner ends to an annular metal manifold 38 fastened to the exterior jacket 23 of the base by angle brackets 40. A blower 42 connected to an intake opening 44 of the manifold blows primary combustion air into the manifold from which the air is discharged into the combustion chamber tangentially of such chamber by the tuyeres 36.

Means are provided for feeding sludge into the burner tube. These means include the previously-mentioned screw conveyor 28 which comprises a casing 50, a hollow central shaft 52 within the casing and a helix, or blade, 54 extending about the shaft 52 between the casing and the shaft. The discharge end of the casing 50 projects into the combustion chamber 16 through the central opening 26 in the base 22 and is enclosed and conically tapered to define a nozzle 56 having discharge orifices 58 in its tapered flanks. The shaft 52 and blade 54 of the conveyor terminate at about the position at which the tapered nozzle portion 56 of the casing commences so that an enclosed space 59 is provided within the nozzle for receiving sludge from the conveyor. A sludge-receiving means, including a hopper 60 adjacent the opposite input end of the casing 50 enables sludge to be fed into the conveyor.

The hollow conveyor shaft 52 extends horizontally beyond the input end of the casing 50 and blade 54, and is connected to a power means for rotating the shaft in a direction to convey sludge into the nozzle 50. The illustrated power means includes an electric motor 62, the drive shaft 64 of which is operatively connected to the conveyor shaft 52 to drive the same by a chain 66 and sprocket 68. The conveyor shaft 52 is rotatably mounted near its outer end in a bearing 70 and is also coupled at 72 to a stationary hollow shaft 74, which is connected in turn to a second air blower 76 for blowing air through the hollow conveyor shaft 52 into the nozzle end 56 of the casing.

In operation, sludge that has been at least partially dehydrated, as, for example, by being passed through a centrifuge, is fed into the hopper 60 and conveyed through the casing 50 by the rotating screw conveyor into the interior of the nozzle 56. Simultaneously air blown through the conveyor shaft 52 by the blower 76 forces the sludge collected within the nozzle out through the discharge orifices 58 in a spray into the combustion chamber 16. Air entering the nozzle 56 through the shaft 52 is prevented from "backing up" between the casing and shaft by the continuous wall of sludge moved forwardly through the casing by the blade 54.

Prior to the entry of sludge, the burner tube is preheated ot combustion temperature by ignited fuel from the burner ring 30. Within the combustion chamber, the sludge is whirled in a rotary path by a high-velocity stream of combustion air introduced into the tube through the tuyeres 36. The whirling particles of sludge are enveloped in a flame, heated and gradually destroyed by combustion. By the time the sludge particles have been borne in a rotary path gradually down the tube to the discharge end thereof, all but the unusually large particles will have been completely consumed. However, those particles that are not consumed can be subjected to further burning in secondary combustion means such as, for example, the incinerator system illustrated in FIG. 4.

Figure 4:
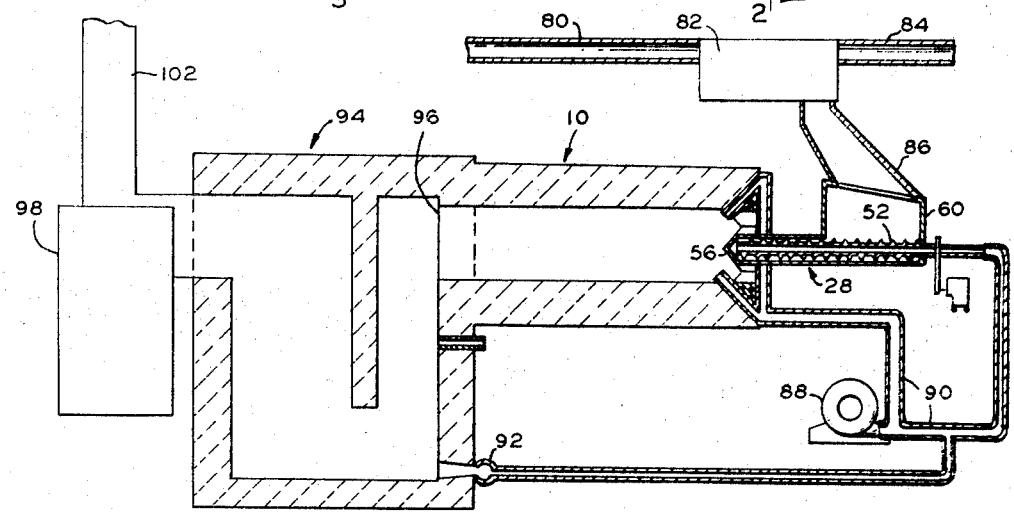
FIG. 4 is a schematic view of apparatus in accordance with the invention incorporated in a complete sludge disposal system.

FIG. 4 illustrates a complete system for destroying sludge and incorporates a burner tube 10 and screw conveyor 28, similar to the ones previously described, as its primary elements. The system commences with a sludge feed line 80 through which sludge-bearing sewage is pumped into a centrifuge dryer or other dewatering means 82, where the sludge is separated from the effluent and then deposited through a chute 86 into the hopper 60 and then into the screw conveyor 28. The effluent is discharged from the centrifuge through the line 84. A single blower 88 and its associated system ducts 90 supply air to the nozzle 56 of the conveyor through the hollow shaft 52, and to an auxiliary, premix burner 92 at the base of a secondary combustion chamber, or incinerator, 94.

Sludge sprayed into the burner tube 10 from the nozzle 56 is burned and simultaneously whirled to the discharge end 96 of the tube and into the incinerator 94, where incompletely burned particles are burned further and ultimately destroyed. For this purpose auxiliary burner 92 at the base of the incinerator injects premixed fuel and air into the incinerator and ignites the same. Gaseous products of combustion from the sludge are drawn with the aid of an induced draft fan (not shown) through the incinerator 94 into a gas washer unit 98 where any ash is removed therefrom, before the gases are discharged into the atmosphere through the stack 102.

Summarizing the method by which sludge is conveyed and destroyed in the previously-described apparatus, sludge is first at least partially dewatered and then is fed continuously by a screw conveyor into a partially enclosed space within the base of a burner tube, which space is defined by the tapered nozzle end 56 of the casing. A stream of forced air is then blown into the enclosed space behind the deposited sludge through the hollow conveyor shaft 52, forcing the sludge out in a spray through orifices in the walls of the tapered nozzle 56, into the burner tube. Within the burner tube the sludge particles are whirled in a rotary path gradually to the discharge end of the burner tube while being destroyed by intense heat and flame at a temperature which may reach upwards of 2000 degrees Fahrenheit. The gaseous products of combustion are then scrubbed and exhausted to atmosphere. Auxiliary fuel consumption will depend on the amount of water remaining as part of the sludge after the dewatering step. The present method has been found to work satisfactorily with sludge having a 15 percent to 20 percent solids content by weight, although optimum results are achieved with sludges having a solids content approaching 40 percent by weight.

I claim:
1. The steps in the method in the method of conveying and destroying sludge, containing water, in an apparatus which includes a cylindrical and horizontally extending combustion chamber having an axially disposed and restricted sludge inlet at one end, which steps in the method comprise:
  (A) partly dewatering a sludge to be destroyed;
  (B) thereafter spraying the sludge longitudinally into said combustion chamber by conveying the partly dewatered sludge under pressure through the restricted inlet to said chamber to effect longitudinal spraying of sludge into said chamber;
  (C) burning all sludge that enters the combustion chamber through said inlet by:
    (1) injecting all air, necessary to complete combustion of the sludge so entering said chamber, tangentially into said chamber adjacent the said inlet to effect whirling of the sprayed sludge, and
    (2) subjecting the whirling sludge to flame.
2. The steps in the method as defined in claim 1, characterized in that the apparatus for carrying out the method includes a casing for delivering the sludge to the combustion chamber, which method includes:
  (D) introducing air under pressure into the casing to force the sludge through the restriction.
3. Apparatus for conveying and destroying sludge comprising:
  a cylindrical burner tube defining a combustion chamber and including an enclosed base and an opposite discharge end portion,
  burner means mounted in said base for injecting fuel into said tube and igniting said fuel,
  a screw conveyor extending centrally through said base, including a casing having a sludge inlet and an outlet, said outlet terminating at the base with the interior of said burner tube,
  a hollow shaft within said casing and having an air inlet and an open discharge end terminating within said casing adjacent the base,
  means external to said burner tube for feeding sludge into the inlet of the casing,
  power means for rotating said shaft in a direction to convey sludge through the outlet of the casing,
  blower means connected to the air inlet of said shaft for blowing air into said tube at the base thereof,
  said base having orifices therethrough in communication with the interior of said burner tube, so that air and sludge entering said tube through said casing is sprayed into said burner tube,
  and air injection means for introducing combustion air through said orifices into said tube in a direction for conveying said sludge in a rotary path through said tube.
4. Apparatus for conveying and destroying sludge comprising:
  a cylindrical burner tube defining a combustion chamber including an enclosed base and an opposite discharge end portion,
  means mounted in the base for injecting fuel into the tube and igniting the fuel,
  a conveyor extending centrally through the base, including a casing having a sludge inlet and an outlet, said outlet terminating at the base within the interior of the burner tube, a hollow shaft within the casing and having an air inlet and an open discharge end terminating adjacent the base, power means for rotating the shaft in a direction to convey sludge through the outlet end of the casing, blower means connected to the air inlet of the shaft for blowing air into said tube at the base thereof, said base having orifices therethrough in communication with interior of the burner tube, so that air and sludge entering the tube through the casing is sprayed into the burner tube, and air injection means for introducing combustion air through said orifices into said tube in a direction for conveying the sludge in a rotary path through said tube.

5. Apparatus according to claim 4 wherein said burner means comprises an annular ring in said base spaced radially outwardly of the discharge end of said screw conveyor, and wherein said air injection means includes a series of annularly spaced tuyeres projecting from said base into said tube in a direction generally tangential to the cylindrical periphery of said tube.

6. Apparatus according to claim 4 wherein said casing forms a conical shell tapering toward the outlet of said casing, the flanks of said shell having discharge orifices therethrough arranged symmetrically about the apex of said conical shell.

7. Apparatus according to claim 4 including dewatering means upstream from said screw conveyor, means for conveying said sludge from said dewatering means to said screw conveyor, and residue removal means downstream from and in communication with said burner tube for removing solid residue from combustion gases resulting from the burning of said sludge within said tube.

References Cited
UNITED STATES PATENTS

| | | | |
|---|---|---|---|
| 2,535,730 | 12/1950 | Gadret | 110—7 X |
| 2,932,712 | 4/1960 | Levin | 110—110 X |
| 3,124,086 | 3/1964 | Sage et al. | 110—7 |
| 3,322,079 | 5/1967 | Komline et al. | 110—8 |
| 3,357,375 | 12/1967 | Brophy | 110—75 |
| 3,366,080 | 1/1968 | Albertson | 110—8 |
| 3,395,654 | 8/1968 | Weisberg et al. | 110—8 |

JAMES W. WESTHAVER, Primary Examiner

U.S. Cl. X.R.

110—28, 110

PO-1050
(5/69)

UNITED STATES PATENT OFFICE
CERTIFICATE OF CORRECTION

Patent No. 3,472,185              Dated October 14, 1969

Inventor(s) Roy B. Burden, Jr.

It is certified that error appears in the above-identified patent and that said Letters Patent are hereby corrected as shown below:

| | |
|---|---|
| Column 2, line 32 | after "fuel" add --line-- |
| Column 3, line 22 | cancel "ot" and substitute --to-- |
| Column 4, line 11 | cancel in the first occurence "in the method" |
| Column 4, line 46 | after "with" add --in-- |

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents